July 25, 1950   G. M. MAGRUM   2,516,782
VALVE STRUCTURE FOR HYDRAULIC SHOCK ABSORBERS
Filed Dec. 29, 1945   2 Sheets-Sheet 1

*Inventor*
Gervase M. Magrum

July 25, 1950 G. M. MAGRUM 2,516,782
VALVE STRUCTURE FOR HYDRAULIC SHOCK ABSORBERS
Filed Dec. 29, 1945 2 Sheets-Sheet 2

Inventor
Gervase M. Magrum

Patented July 25, 1950

2,516,782

UNITED STATES PATENT OFFICE 2,516,782

VALVE STRUCTURE FOR HYDRAULIC SHOCK ABSORBERS

Gervase M. Magrum, Buffalo, N. Y., assignor to Houdaille-Hershey Corporation, Detroit, Mich., a corporation of Michigan Application December 29, 1945, Serial No. 638,238

18 Claims. (Cl. 188—89)

This invention relates to improvements in rotary hydraulic shock absorbers of the type wherein a rotary vaned piston or wing shaft operates oscillatably within a housing providing hydraulic working chambers between which hydraulic fluid is adapted to be displaced under predetermined resistance to flow as determined by valve structure assembled with the wing shaft.

It will be appreciated that the most important structure of the shock absorber assembly is the hydraulic control valve structure because the performance characteristics of the entire device are dependent thereon. The trend of development toward improving the operation characteristics of this type of shock absorber has generally been toward greater complexity and correspondingly more costly construction.

An important object of the present invention is to provide an improved control valve structure for rotary hydraulic shock absorbers which in addition to affording improved operating and performance characteristics, affords decided advantages as to economy in manufacture.

Another object of the invention is to provide a control valve structure for hydraulic shock absorbers which attains improved hydraulic fluid responsiveness and is unusually rugged and devised to operate in trouble-free fashion with a minimum of adjustments.

A further object of the invention is to provide a new and improved control valve structure for hydraulic shock absorbers in which the component parts are simple and easy to make by economical mass production methods of manufacture and are exceedingly easy to assemble rapidly and accurately.

Still another object of the invention is to provide a control valve structure for hydraulic shock absorbers in which the majority of component parts can be made in automatic or semi-automatic machines, with little or no additional finish machining operations required to complete them for use.

Yet another object of the invention is to provide a control valve structure for hydraulic shock absorbers which makes novel use of ball or spherical valves and in which a high degree of tolerance is afforded in the various components.

A still further object of the invention is to provide in a hydraulic shock absorber an improved rotary piston or wing shaft construction.

Other objects, features and advantages of the present invention will be readily apparent from the following detailed description taken in conjunction with the accompanying two sheets of drawings in which.

Figure 1:
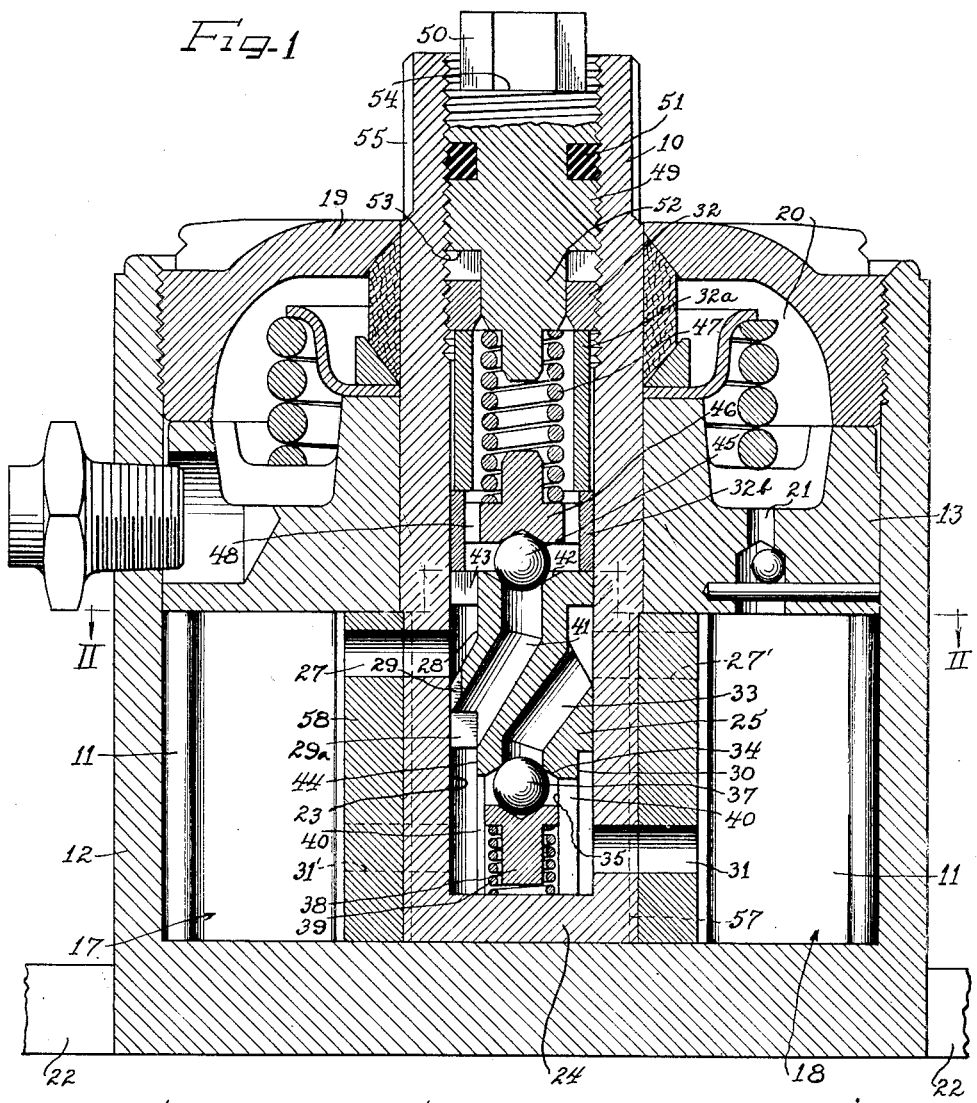
Figure 1 is a vertical sectional view through a rotary hydraulic shock absorber embodying the features of the present invention, and presented in some respects schematically in that the section is laid flat although it is taken on the irregular section line I—I of Figure 2.
Figure 3:
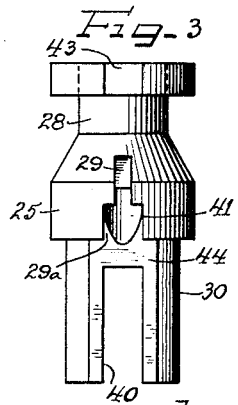
Figure 3 is a side elevational view of the valve body unit of the valve assembly.
Figure 4:
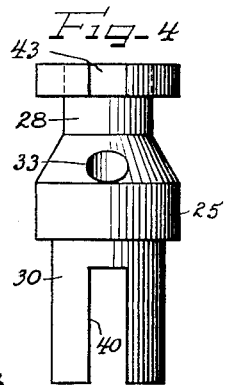
Figure 4 is an elevational view of the opposite side of the valve body.
Figure 5:
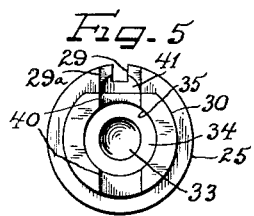
Figure 5 is a bottom plan view of the valve body.

A shock absorber of the type with which the present invention is concerned comprises a rotary piston or wingshaft 10 carrying a diametrically opposite pair of vanes or wings 11 oscillatable in a cup-shaped casing or housing 12. An axial bearing for the wingshaft is provided by a wall member 13 located adjacent to the outer end of the housing and provided with integral inwardly extending abutments 14 projecting to the base of the housing and pinned against relative rotation, as at 15. The abutments 14 cooperate in well known manner with the vanes or wings 11 to define hydraulic working chambers 17, 17' and 18, 18'. To hold the bearing and abutment wall 13 in axial position, a closure or cover 19 is threaded into the outer end of the housing 12. A cooperatively recessed formation between the bearing wall member 13 and the cover 19 provides a hydraulic fluid chamber 20 which communicates with the working chambers through one or more check valve-controlled passageways 21, in a manner well known in the art.

In use upon a vehicle, the shock absorber is mounted operatively on the chassis through the medium of laterally projecting ears 22, while the wingshaft 10 is connected by suitable linkage system with an axle of the vehicle so that upon relative movement between axle and chassis the wingshaft will be oscillated within the housing to displace fluid in the working chambers.

Figure 2:
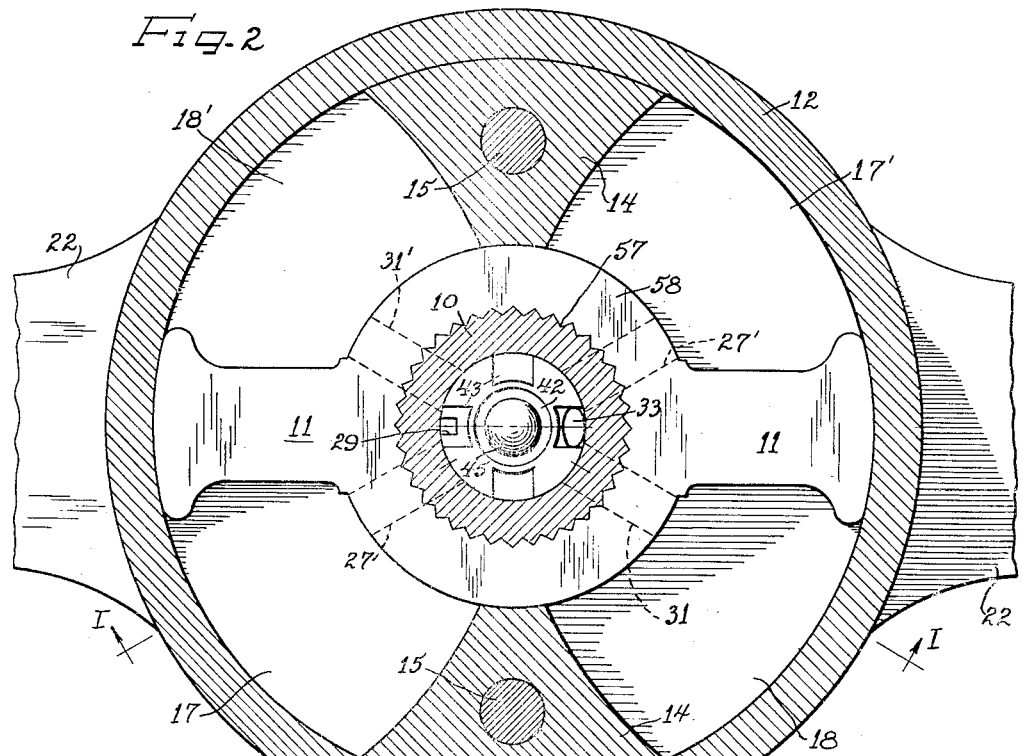
Figure 2 is a horizontal sectional view taken substantially along the line II—II of Figure 1.

As will be clear from Figure 2, oscillation of the wingshaft 10 causes hydraulic fluid to be displaced alternately from one set of working chambers to the other set of working chambers. Herein, the chambers 17 and 17' are adapted to have hydraulic fluid displaced therefrom on the compression turn or stroke and the set of chambers 18, 18' is adapted to have fluid displaced therefrom upon rebound stroke. Displacement of the hydraulic fluid is, however, controlled in such a manner that where the compression and rebound movements are gradual or relatively slow, which may be termed as normal flow condition, the hydraulic fluid is metered in its displacement from one set of chambers to the other according to a predetermined rate calculated to restrain relative movements of the chassis and axle only slightly if at all. Should the relative compression or rebound movement occur abruptly as transpires frequently during operation of the vehicle, so that a relatively large volume of fluid must be displaced quite rapidly quick-displacement of the hydraulic fluid is permitted but only metered return of the hydraulic fluid is provided for, whereby any shock that might occur incidental to compression or rebound movements is absorbed. Means for effective flow control over the hydraulic fluid comprises valve structure assembled with the wingshaft 10.

According to the present invention, the fluid flow controlling valve structure comprises an assembly disposed within and supported by the wingshaft 10 as a self-contained unit. To this end, the wingshaft 10 is formed with an axial bore 23 extending from its outer end to a point short of the inner end thereof and closed at its inner end by an integral closure wall or base 24. Within the bore 23 is received a cylindrical, elongated, preferably one piece valve body 25 which is of a diameter to fit very closely but slidably in the bore. Upon compression rotation or stroking operation of the wingshaft, hydraulic fluid is displaced from the outer ends of the working chambers 17, 17' through radial passageways 27, 27', respectively, into the bore 23 and enters a substantial peripheral groove 28 adjacent the outer end of the valve body 25. From the groove 28 the displaced fluid is metered through an axially extending orifice 29 to an annular groove provided by a setback or rabbet 30 formed in the periphery of the valve body in axially spaced relation to the groove 28 and running to the inner end of the valve body. Thence the displaced fluid passes from the bore 23 through passageways 31 and 31' into the inner ends of respectively the chambers 18 and 18'. Upon rebound stroke just the reverse flow of displaced hydraulic fluid will occur. The longitudinal orifice 29 may be simply in the form of a slot opening radially from the periphery of the valve body but closed in the assembly by the contiguous portion of the wall of the bore 23. Frictional resistance to pressure fluid flow through the orifice 29 is minimized by a substantial enlargement 29a thereof at its inner end where it opens into the rebound groove 30. The direction of compression fluid flow is thus axially inwardly relative to the valve body 25, and rebound fluid flow is generally axially outwardly relative to the valve body.

In order to hold the valve body 25 against axial displacement from fluid pressure, it is preferably secured in place by means such as a ring nut 32 and threaded down inside the outer end portion of the bore 23 and driving against the outer end of the valve body through the medium of interposed axially aligned outer and inner spacer sleeves 32a and 32b, the purpose for which will presently appear.

Where the compression stroke of the wingshaft 10 is of such abruptness and force that pressure release or blowoff is required, the fluid in excess of the capacity of the metering orifice 29 is bypassed by way of an angular blowoff passageway 33 in the valve body leading from the compression fluid groove 28 to a ball valve seat 34 formed concentrically within the valve body at the inner end of an axial bore 35 opening through the base end at the valve body. Normally closing the blowoff passageway 33 is a ball check valve 37 which is held to the seat 34 by a retainer 38 axially slidable in the bore 35 and urged toward the valve seat by a helical compression spring 39 which is maintained under compression by bearing against the wingshaft base 24. Compression blowoff fluid passing the ball valve 37 leaves the bore 35 freely through radial slots 40 in the wall of the valve body joining the bore 35 with the annular peripheral groove 30.

When rebound release or blowoff is required, the blowoff fluid enters an angular bypass passage 41 which opens from the annular groove 30 at the orifice relief enlargement 29a and exhausts through a ball valve seat 42 disposed concentrically at the outer end of the valve body. The hydraulic fluid displaced by rebound blowoff passes to the interior of the spacer sleeve 32b and thence through a series of radially extending relief slots 43 in the head of the valve body to the annular groove 28, whence the flow resumes normal direction again. Restraint upon flow of rebound blowoff fluid to the passageway 41 is avoided by somewhat increasing the capacity of the rebound groove 30 in the immediate vicinity of the mouth of the passageway, as by flattening the wall of the groove at 44.

Compression flow of the hydraulic fluid through the rebound blowoff passage 41 is prevented by a ball check valve 45 held to the seat 42 by a retainer 46 urged thereagainst by a helical compression spring 47. The retainer 46 is guided slidably for axial movement by the sleeve 34 and is preferably provided with pressure relief passageways such as radial slots 48 affording communication between the inner and outer sides of the retainer. The compression spring 47 is dimensioned to be received in full radially cleared relation within the spacer sleeve 32a and is engaged at its outer end by a plug 49 which extends through the ring nut 32 and has the body thereof threaded into the wing shaft bore 23. At its outer end the plug 49 carries a head 50 which is adapted to be engaged by a suitable wrench for adjusting the axial position of the plug 49 and thereby affecting the tension or load of the compression spring 47. As a result, the pressure at which rebound relief or blowoff will occur can be readily adjusted from the outer end of the wingshaft. A thread seal 51 carried by the plug 49 prevents leakage of hydraulic fluid out past the plug.

A limit upon over-tightening of the plug 49 is afforded by predetermining the length of a reduced diameter portion 52 which passes through the ring nut 32 so that when the predetermined extreme loaded limit is reached, a shoulder 53 on the plug body engages the outer face of the ring nut 32 as a stop. Similarly, means to provide an indication or limit upon inadvertent loosening of the plug 49 beyond the minimum load compression limit may comprise such a relative disposition of an outer shoulder 54 on the plug that when such shoulder attains a position flush with the outer end of the wingshaft 10 it will indicate that the limit of minimum load compression has been attained.

All of the components of the fluid control valve assembly, and for that matter the wingshaft assembly itself aside from the valve assembly, are adapted to be made according to the most economical mass production methods of manufacture. All of the parts can be made with automatic or semi-automatic production machinery. The wingshaft 10 is adapted to be formed separately from the vanes or wings 11 and can thus be made from round bar stock as an automatic screw machine part and when finished may include outer longitudinal serrations 55 for attaching of the operating leverage system, and inner longitudinal serrations 57 for non-rotary assembly within a complementary serrated connecting eye 58 integrally uniting the wings 11. In this construction, the wings 11, as a unit or section, can be cut from a rolled, especially shaped bar and finished.

Assembly of the various components of the wingshaft and valve structure can be accomplished with the utmost facility. After the wingshaft and vane section has been assembled, the wingshaft is assembled in inverted position with the inverted valve body 25 within the base end of which has been assembled the ball valve 37, the retainer 38 and the compression spring 39. After the valve body 25 and the components assembled therewith have been driven home, the sub-assembly thus produced is turned about to place the outer end of the bore 23 upward and then the ball valve 45, the sleeve 32b, the retainer 46, the sleeve 32a, and the ring nut 32 are assembled within the bore 23 in approximately the order named. Thereupon, the spring 47 and the plug 49 are placed in the assembly and the wingshaft and valve structures comprise a complete unit ready to be assembled functionally with the remainder of the shock absorber.

Figure 6:
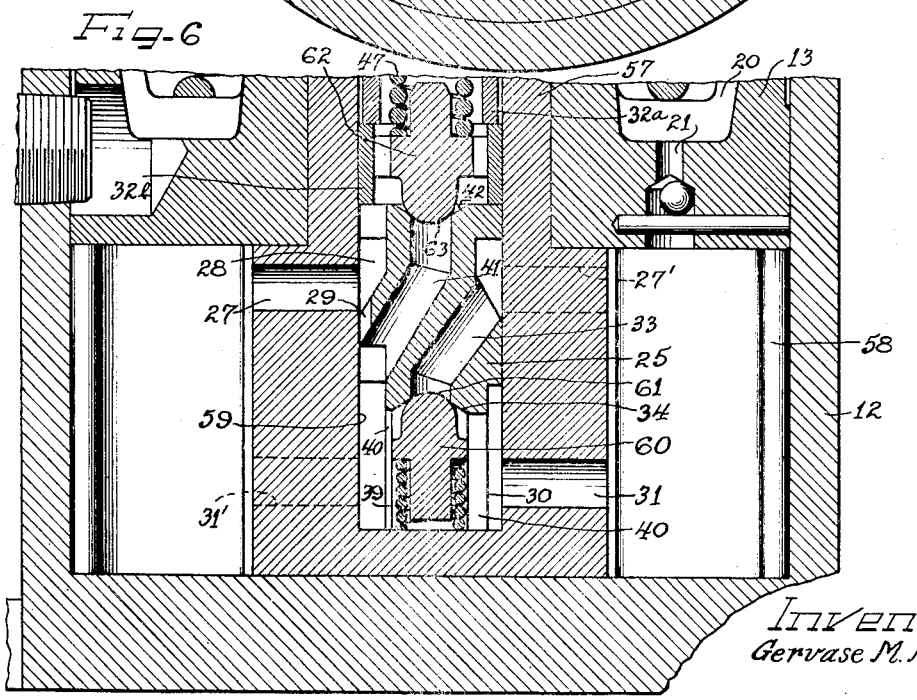
Figure 6 is a fragmentary vertical sectional view on the same order as Figure 1 but showing a slightly modified construction in the valve assembly.

In the modified form of the invention shown in Figure 6, all of the operational characteristics are identical with the form of the invention described and most of the structural details are identical with the exceptions to be mentioned. Identity of structural detail is indicated by identical reference numerals. One difference that will be noted immediately in this modified form, resides in a conventional one-piece wingshaft and vane or wing structure wherein a shaft 57 has vanes 58 provided integral therewith as a forging which is machined and axially bored to within short of its inner ends to provide a valve bore 59 corresponding to the bore 23 in the form of Figure 1. The valve structure including the valve body 25 and the various cooperative parts of the assembly are mounted within the bore 59 and function in every particular as previously decribed. Instead of spherical ball check valves, and retainer combinations, one-piece semi-spherical valve and spring retainer units may be provided. Thus, a one-piece check valve and retainer unit 60 may be provided with a semi-spherical valve head 61 to seat in controlling relation to the compression blowoff passage 33 at the valve seat 34, and in slidable relation within the base end axial bore 35 of the valve body. Likewise, a combination check valve end retainer 62 has a semi-spherical valve head 63 received in the valve seat 42 to control the discharge end of the rebound relief or blowoff passageway 41 in the valve body. The combination valve and retaining members 60 and 62 are adapted to be molded from suitable plastic material, and for that purpose may prove somewhat more economical in very large quantities over the equivalent metal parts.

An important advantage of using ball or ball type valve elements to control the blowoff passages resides in the self-centering seating of such valves and the substantial manufacturing tolerances thus permissible in the parts of the device with nonetheless leakproof sealing of the passageways against fluid flow in the checked direction.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in control valve mechanism adapted for controlling the displacement of hydraulic fluid between the working chambers of a rotary hydraulic shock absorber, a valve body having an exterior metering orifice and affording communication through said orifice for normal compression and rebound displacement of hydraulic fluid, and valve controlled blowoff passageways interiorly of said valve body bypassing said orifice.

2. In combination in a valve structure for a rotary hydraulic shock absorber and adapted to be mounted within a hollow wingshaft having passageways opening thereinto for communication with compression and rebound working chambers to afford fluid displacement communication between such chambers, a valve body adapted to be disposed within the shaft and having axially spaced annular peripheral grooves for receiving respectively compression and rebound displaced fluid, a metering passageway connecting said grooves to afford a restricted flow path for interflow of displaced hydraulic fluid under normal pressure conditions, and separate compression and rebound blowoff passageways bypassing said metering passageway through said valve body, said compression blowoff passageway opening axially from said valve body in one direction, said rebound blowoff passageway opening axially from the valve body in the opposite direction, and respective valves controlling the openings from the passageways.

3. In combination in a valve structure for a rotary hydraulic shock absorber and adapted to be mounted within a hollow wingshaft having passageways opening thereinto for communication with compression and rebound working chambers to afford fluid displacement communication between such chambers, a valve body adapted to be disposed within said shaft and having axially spaced annular peripheral grooves for receiving respectively compression and rebound displaced fluid, a metering passageway connecting said grooves to afford a restricted flow path for interflow of displaced hydraulic fluid under normal pressure conditions, and separate compression and rebound blowoff passageways bypassing said metering passageway through said valve body, said compression blowoff passageway opening axially from said valve body in one direction, said rebound blowoff passageway opening axially from the valve body in the opposite direction, and separate valve balls controlling the respective openings from said blowoff passageways and having means for maintaining the same under resilient seating compression.

4. In combination in a valve structure for a rotary hydraulic shock absorber and adapted to be mounted within a hollow wingshaft having passageways opening thereinto for communication with compression and rebound working chambers to afford fluid displacement communication between such chambers, a valve body adapted to be disposed within said shaft and having axially spaced annular peripheral grooves for receiving respectively compression and rebound displaced fluid, a metering passageway connecting said grooves to afford a restricted flow path for interflow of displaced hydraulic fluid under normal pressure conditions, and separate compression and rebound blowoff passageways bypassing said metering passageway through said valve body, said compression blowoff passageway opening axially from said valve body in one direction, said rebound blowoff passageway opening axially from the valve body in the opposite direction, and separate valve members having semi-spherical heads controlling the openings to said respective blowoff passageways and including resilient compression means to maintain the same seated but responsive to predetermined blowoff pressures.

5. In combination in a control valve structure for rotary hydraulic shock absorbers including a hollow wingshaft, a valve body adapted to be located within the inner end portion of the wingshaft and provided with concentric peripheral grooves axially spaced apart but connected by a restricted passage of predetermined metering value to afford intercommunication between the grooves for normal compression and rebound hydraulic fluid displacement, compression blowoff and rebound blowoff passageways interiorly of the valve body and affording communication between said grooves to bypass said metering passage, one of said blowoff passageways opening from one end of the valve body, a one way check valve controlling said end opening, means affording communication between said end opening and the adjacent groove, and a one way check valve controlling the other blowoff passageway interiorly of the valve body.

6. In combination an elongated casing having a bore opening through one end and closed at its opposite end, said casing having fluid displacement passageways communicating with said bore, an elongated valve body bottomed in said bore and having an annular displacement fluid groove around its base portion communicating with certain of the fluid displacement passageways and an axially outwardly spaced annular groove communicating with other of the fluid displacement passageways, said annular grooves being connected by a restricted metering passage to afford intercommunication between the grooves for fluid displacement under operating pressures, an internal blowoff passageway in said valve body extending from said outwardly spaced displacement groove to a point axially internally of the body and having an axial bore opening through the base end of the valve body in communication therewith, a check valve operable in said valve body bore to control the passage of displaced blow-off fluid through said passageway, a spring bottomed in the closed end of the casing and acting upon said check valve, said valve body bore and said base displacement fluid groove being in communication through the wall of the valve body.

7. In combination, an elongated casing having a bore opening through one end and closed at its opposite end, said casing having fluid displacement passageways communicating with said bore, an elongated valve body bottomed in said bore and having an annular displacement fluid groove around it base portion communicating with certain of the fluid displacement passageways and an axially outwardly spaced annular groove communicating with other of the fluid displacement passageways, said annular grooves being connected by a restricted metering passage to afford intercommunication between the grooves for fluid displacement under normal operating pressures, an internal blowoff passageway in said valve body extending from said outwardly spaced groove to a point axially internally of the body and having an axial bore opening through the base end of the valve body in communication therewith, a check valve operable in said valve body bore to control the passage of displaced blowoff fluid through said passageway, a spring bottomed in the closed end of the casing and acting upon said check valve, said valve body bore and said base displacement fluid groove being in communication through the wall of the valve body, a second valve body blowoff passageway extending from said base fluid displacement groove and opening axially from the outer end of the valve body, and a check valve controlling the opening from said second passageway.

8. In combination, an elongated casing having a bore opening through one end and closed at its opposite end, said casing having fluid displacement passageways communicating with said bore, an elongated valve body bottomed in said bore and having an annular displacement fluid groove around its base portion communicating with certain of the fluid displacement passageways and an axially outwardly spaced annular groove communicating with other of the fluid displacement passageways, said annular grooves being connected by a restricted metering passage to afford intercommunication between the grooves for fluid displacement under normal operating pressures, an internal blowoff passageway in said valve body extending from said outwardly spaced groove to a point axially internally of the body and having an axial bore opening through the base end of the valve body in communication therewith, a check valve operable in said valve body bore to control the passage of displaced blowoff fluid through said passageway, a spring bottomed in the closed end of the casing and acting upon said check valve, said valve body bore and said base displacement fluid groove being in communication through the wall of the valve body, a second valve body blowoff passageway extending from said base fluid displacement groove and opening axially from the outer end of the valve body, a check valve controlling the opening from said second passageway, and means for maintaining said last mentioned check valve under controlled compression.

9. In combination, a casing having a bore opening through one end and closed at its opposite end, said casing having fluid displacement passageways communicating with said bore, an elongated valve body bottomed in said bore and having an annular displacement fluid groove around its base portion communicating with certain of the fluid displacement passageways and an axially outwardly spaced annular groove communicating with other of the fluid displacement passageways, said annular grooves being connected by a restricted metering passage to afford intercommunication between the grooves for fluid displacement under normal operating pressures, an internal blowoff passageway in said valve body extending from said outwardly spaced displacement groove to a point axially internally of the body and having an axial bore opening through the base end of the valve body in communication therewith, a check valve operable in said valve body bore to control the passage of displaced blowoff fluid through said passageway, a spring bottomed in the closed end of the casing and acting upon said check valve, said valve body bore and said base displacement fluid groove being in communication through the wall of the valve body, a second valve body blowoff passageway extending from said base fluid displacement groove and opening axially from the outer end of the valve body, a check valve controlling the opening from said second passageway, and means for maintaining said last mentioned check valve under controlled compression, said compression controlling means including a screw plug available for manipulation from said one end of the casing for adjusting the compression imposed upon said last mentioned check valve.

10. In a control valve structure for rotary hydraulic shock absorbers, a substantially cylindrical valve body, concentric axialy spaced peripheral annular grooves in said body, a metering orifice connecting said grooves at the periphery of the body, and blowoff passageways affording independent communication between said grooves interiorly of the body and bypassing said metering orifice.

11. In a valve structure for rotary hydraulic shock absorbers, an elongated cylindrical valve body having axially spaced concentric annular peripheral grooves, a restricted metering orifice in the periphery of said body connecting said grooves, a blowoff passageway connecting directly with one of said grooves and extending through the interior of the body to open axially therefrom for communication with the other of said grooves, and another blowoff passageway connecting directly with said other of said grooves and opening axialy from the body in the opposite direction for communication with said one groove.

12. In combination in a valve structure adapted to be mounted within a hollow wingshaft of a rotary hydraulic shock absorber for controlling fluid displacement through the wingshaft, a valve body having a metering orifice therein affording a restricted passageway for displacement of hydraulic fluid under pressure in opposite directions, separate pressure fluid passageways bypassing said orifice, separate valve members in control of said bypass passageways, and means for adjusting the pressure responsiveness of the valve members.

13. In combination in a construction of the character described, a casing having a blind end bore and a set of hydraulic fluid passageways extending from the inner portion of said bore through the casing, a valve assembly for controlling passage of fluid between said passageways and comprising a valve body bottomed in the blind end of said bore, said valve body having fluid controlling passages therethrough, check valves in control of said passages, and means for retaining said valve body bottomed within the blind end of the bore comprising a member secured adjacent the open end of the bore and bearing against said valve body.

14. In combination in a construction of the character described, a casing having a blind end bore and a set of hydraulic fluid passageways extending from the inner portion of said bore through the casing, a valve assembly for controlling passage of fluid between said passageways and comprising a valve body bottomed in the blind end of said bore, said valve body having fluid controlling passages therethrough, check valves in control of said passages, means for retaining said valve body bottomed within the blind end of the bore comprising a cylindrical member fixedly retained within the bore and bearing against said valve body, and a plug threaded into the bore and axially movable through said tubular member and having means operative between the end of the plug and the adjacent end of the valve body for controlling the action of one of the check valves.

15. In combination in a construction of the character described, a casing having a blind end bore and hydraulic fluid passageways communicating with the inner end portion of said bore, a valve assembly within the blind end portion of the bore for controlling passage of hydraulic fluid from said passageways through said bore, said valve assembly including a valve body bottomed in the blind end of said bore and including fluid controlling passages therethrough, one of said passages opening axially through the outer end of said valve body and having a check valve in control thereof, a cylindrical member fixedly secured within said bore and bearing against the outer end of the valve body for retaining the valve body in said bottomed position, and means for controlling the action of said check valve including a member axially movably disposed adjacent to the outer end of said bore and having means extending through said tubular valve body retaining member into operative relation to said check valve.

16. In combination in a construction of the character described, a casing having a cylindrical blind end bore, said casing having transverse hydraulic fluid passageways opening into the blind end portion of the bore, a valve assembly for controlling displacement of hydraulic fluid between said passageways through said bore, said assembly including a cylindrical valve body bottomed within the blind end portion of the bore and having fluid displacement passageways therethrough, check valves controlling said fluid displacement passageways of the valve body, the outer end portion of the bore being threaded, and means threaded into the outer end portion of the bore and bearing against the outer end portion of the valve body to hold the same bottomed within the bore.

17. In a valve structure adapted for use in a rotary hydraulic shock absorber, a valve body having spaced annular fluid grooves thereabout, said body having passages therethrough one of which opens through one end of the valve body and communicates with one of said grooves and another of which opens through the opposite end of the valve body and communicates with the remaining of said grooves, said valve body having respective external passages between said grooves and the respective ends of the valve body through which the internal passages communicating with the respectively other grooves open.

18. In a valve structure adapted for use in a rotary hydraulic shock absorber, a valve body having spaced annular fluid grooves thereabout, said body having passages therethrough one of which opens through one end of the valve body and communicates with one of said grooves and another of which opens through the opposite end of the valve body and communicates with the remaining of said grooves, said valve body having respective external passages between said grooves and the respective ends of the valve body through which the internal passages communicating with the respectively other grooves open, said valve body also having a metering passage on the exterior thereof intercommunicating between said grooves.

GERVASE M. MAGRUM.

REFERENCES CITED

The following references are of record in the file of this patent:

UNITED STATES PATENTS

| Number | Name | Date |
|---|---|---|
| 1,807,422 | Manzel | May 26, 1931 |
| 1,811,381 | Berwick | June 23, 1931 |
| 1,910,049 | Peo | May 23, 1933 |
| 1,940,694 | Peo | Dec. 26, 1933 |
| 2,004,960 | Peo | June 18, 1935 |
| 2,089,419 | Peo et al. | Aug. 10, 1937 |
| 2,286,291 | Magrum | June 16, 1942 |
| 2,298,396 | Magrum | Oct. 13, 1942 |
| 2,334,340 | Magrum | Nov. 16, 1943 |
| 2,358,988 | Magrum | Sept. 26, 1944 |